(12) United States Patent
Cantin

(10) Patent No.: US 10,346,743 B2
(45) Date of Patent: *Jul. 9, 2019

(54) SPECULATIVE ASYNCHRONOUS SUB-POPULATION EVOLUTIONARY COMPUTING

(71) Applicant: International Business Machines Corporation, Armonk, NY (US)

(72) Inventor: Jason F. Cantin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/420,347

(22) Filed: Jan. 31, 2017

(65) Prior Publication Data

US 2017/0140274 A1     May 18, 2017

Related U.S. Application Data

(63) Continuation of application No. 13/174,441, filed on Jun. 30, 2011, now Pat. No. 9,563,844.

(51) Int. Cl.
    *G06N 3/12*        (2006.01)
    *G06N 20/00*     (2019.01)

(52) U.S. Cl.
    CPC .............. *G06N 3/126* (2013.01); *G06N 20/00* (2019.01)

(58) Field of Classification Search
    None
    See application file for complete search history.

(56) References Cited

U.S. PATENT DOCUMENTS

| 5,343,554 A | 8/1994 | Koza et al. |
| 5,363,098 A | 11/1994 | Antoshenkov |
| 5,390,283 A | 2/1995 | Eshelman et al. |

(Continued)

FOREIGN PATENT DOCUMENTS

| WO | 199963997 | 12/1999 |
| WO | 2001067186 | 9/2001 |

(Continued)

OTHER PUBLICATIONS

"Crossover and Mutation", http://www.obitko.com/tutorials/genetic-algorithms/crossover-mutation.php, 1998, 1 page.

(Continued)

*Primary Examiner* — Alexey Shmatov
*Assistant Examiner* — Robert Bejcek, II
(74) *Attorney, Agent, or Firm* — DeLizio Law, PLLC

(57) ABSTRACT

A tool computes fitness values for a first generation of a first sub-population of a plurality of sub-populations. A population of candidate solutions for an optimization problem was previously divided into the plurality of sub-populations. The population of candidate solutions was created for an iterative computing process in accordance with an evolutionary algorithm to identify a most fit candidate solution for the optimization problem. The tool determines a speculative ranking of the first generation of the first sub-population prior to the fitness values being computed for all candidate solutions in the first generation of the first sub-population. The tool generates a next generation of the first sub-population based, at least in part, on the speculative ranking prior to completion of computation of the fitness values for the first generation of the first sub-population.

8 Claims, 9 Drawing Sheets

(56) References Cited

U.S. PATENT DOCUMENTS

| | | |
|---|---|---|
| 5,443,076 A | 8/1995 | Bau |
| 5,651,099 A | 7/1997 | Konsella |
| 5,742,738 A | 4/1998 | Koza et al. |
| 5,857,196 A | 1/1999 | Angle et al. |
| 5,946,674 A | 8/1999 | Nordin et al. |
| 6,031,935 A | 2/2000 | Kimmel |
| 6,057,424 A | 5/2000 | Vail |
| 6,058,385 A | 5/2000 | Koza et al. |
| 6,128,607 A | 10/2000 | Nordin et al. |
| 6,260,031 B1 | 7/2001 | Schaffer et al. |
| 6,442,582 B1 | 8/2002 | Hale |
| 6,532,076 B1 | 3/2003 | Sidorowich |
| 6,532,453 B1 | 3/2003 | Koza et al. |
| 6,539,366 B1 | 3/2003 | Doyle et al. |
| 6,553,357 B2 | 4/2003 | Mathias et al. |
| 6,691,285 B1 | 2/2004 | Burden et al. |
| 6,725,326 B1 | 4/2004 | Patra et al. |
| 6,882,989 B2 | 4/2005 | Stevens |
| 7,031,887 B2 | 4/2006 | Jain et al. |
| 7,043,463 B2 | 5/2006 | Bonabeau et al. |
| 7,045,674 B2 | 5/2006 | Davisson |
| 7,191,168 B1 | 3/2007 | Buchsbaum et al. |
| 7,313,666 B1 | 12/2007 | De Silva et al. |
| 7,383,235 B1 | 6/2008 | Ulyanov et al. |
| 7,451,121 B2 | 11/2008 | Wu et al. |
| 7,469,237 B2 | 12/2008 | Cooper |
| 7,514,407 B2 | 4/2009 | Averback |
| 7,560,248 B1 | 7/2009 | Raines |
| 7,603,326 B2 | 10/2009 | Bonabeau et al. |
| 7,937,569 B1 | 5/2011 | Sander et al. |
| 8,489,526 B2 | 7/2013 | Cantin |
| 2002/0016782 A1 | 2/2002 | Cooper |
| 2002/0019975 A1 | 2/2002 | Johnson |
| 2002/0120407 A1 | 8/2002 | Stevens |
| 2002/0183510 A1 | 12/2002 | Vail |
| 2003/0028578 A1 | 2/2003 | Jain et al. |
| 2003/0055614 A1 | 3/2003 | Pelikan et al. |
| 2003/0126598 A1 | 7/2003 | Agnihotri et al. |
| 2004/0002460 A1 | 1/2004 | Averback |
| 2004/0008883 A1 | 1/2004 | Shi et al. |
| 2004/0010479 A1 | 1/2004 | Ali |
| 2004/0024750 A1 | 2/2004 | Ulyanov et al. |
| 2004/0029809 A1 | 2/2004 | Averback |
| 2004/0044633 A1 | 3/2004 | Chen |
| 2004/0133929 A1 | 7/2004 | Davisson |
| 2004/0143559 A1 | 7/2004 | Ayala et al. |
| 2004/0210545 A1 | 10/2004 | Branke et al. |
| 2004/0254901 A1 | 12/2004 | Bonabeau et al. |
| 2005/0044052 A1 | 2/2005 | Zhu |
| 2005/0159897 A1 | 7/2005 | Anderson et al. |
| 2005/0197978 A1 | 9/2005 | Anderson et al. |
| 2005/0197979 A1 | 9/2005 | Anderson et al. |
| 2006/0195204 A1 | 8/2006 | Bonabeau et al. |
| 2007/0116267 A1 | 5/2007 | Speirs et al. |
| 2007/0172828 A1 | 7/2007 | Schaffer et al. |
| 2008/0103995 A1 | 5/2008 | Mohamed et al. |
| 2009/0150080 A1 | 6/2009 | Dawkins et al. |
| 2009/0252718 A1 | 10/2009 | Jeyaseelan et al. |
| 2009/0292180 A1 | 11/2009 | Mirow |
| 2010/0113397 A1 | 5/2010 | Wong et al. |
| 2012/0130928 A1 | 5/2012 | Bell, Jr. et al. |
| 2013/0173511 A1 | 7/2013 | Cantin |

FOREIGN PATENT DOCUMENTS

| | | |
|---|---|---|
| WO | 2003074558 | 9/2003 |
| WO | 2004104029 | 12/2004 |
| WO | 2005078629 | 8/2005 |
| WO | 2006135345 | 12/2006 |
| WO | 2007123923 | 11/2007 |

OTHER PUBLICATIONS

"Plug-and-Play Macroscopes", Communications of the ACM, Mar. 2011, 116 pages.

"U.S. Appl. No. 13/174,441 Final Office Action", dated Nov. 21, 2013, 30 Pages.

"U.S. Appl. No. 13/174,441 Office Action", dated Jun. 5, 2013, 30 pages.

"U.S. Appl. No. 13/343,558 Final Office Action", dated Jul. 31, 2014, 17 Pages.

"U.S. Appl. No. 13/343,558 Office Action", dated Nov. 21, 2013, 16 Pages.

"U.S. Appl. No. 13/592,851 Final Office Action", dated Nov. 20, 2013, 20 pages.

"U.S. Appl. No. 13/592,851 Office Action", dated Jun. 17, 2013, 37 pages.

"U.S. Appl. No. 13/916,301 Office Action", dated Jan. 15, 2014, 8 pages.

Affenzeller, et al., "Genetic Algorithms and Genetic Programming: Modem Concepts and Practical Applications", CRC Press, 2009, Apr. 9, 2009, pp. 138-139.

Alba, et al., "Influence of the Migration Policy in Parallel Distributed GAs with Structured and Panmictic Populations", Applied Intelligence vol. 12 Issue 3, May-Jun. 2000, May-Jun. 2000, 163-181.

Baluja, "Genetic Algorithms and Explicit Search Statistics", Justsystem Pittsburgh Research Center & School of Computer Science, Carnegie Mellon University, 1997, 7 pages.

Bright, et al., "An Efficient Random Number Generation Architecture for Hardware Parallel Genetic Algorithms", Lecture Notes in Computer Science; vol. 1917 pp. 583-588 Year of Publication: 2000 ISBN:3-540-41056-2, 2000, pp. 583-588.

Colton, "Lecture 16 Genetic Algorithms", 2004, 8 pages.

Dubrovsky, et al., "A Genetic Algorithm with a Compact Solution Encoding for the Container Ship Stowage Problem", Journal of Heuristics, vol. 8 , Issue 6 (Nov. 2002) pp. 585-599 Year of Publication: 2002 ISSN:1381-1231, Nov. 2002, pp. 585-599.

Ergezer, et al., "Oppositional Biogeography-Based Optimization", IEEE publication, 2009, pp. 1009-1014.

Gong, et al., "Parallel Genetic Algorithms on Line Topology of Heterogeneous Computing Resources", GECCO '05 Proceedings of the 2005 conference on Genetic and evolutionary computation, 2005, 1447-1454.

Greenwell, et al., "Optimal Mutation Probability for Genetic Algorithms", Mathematical and Computer Modelling vol. 21, No. 8, Apr. 1995 , pp. 1-11(11), Apr. 1995, pp. 1-11.

Jin, et al., "Fitness Approximation in Evolutionary Computation—A Survey", Proceedings of the Genetic and Evolutionary Computation Conference, 2002, pp. 1105-1112.

Kargupta, "Search, Polynomial Complexity, and the Fast Messy Genetic Algorithm", Illigal Report No. 95008, Oct. 1995, 202 pages.

Mitrevski, et al., "Prediction and Speculation Techniques in ILP", 22nd Int. Conf. Information Technology Interfaces ITI2000, Jun. 2000, pp. 67-72.

Nowostawski, et al., "Dynamic Demes Parallel Genetic Algorithm", May 13, 1999, 6 pages.

Ochoa, et al., "Optimal Mutation Rates and Selection Pressure in Genetic Algorithms", Proceedings of the Genetic and Evolutionary Computation Conference (GECCO '00), Jul. 8-12, 2000, 8 pages.

Pal, et al., "Genetic algorithms for pattern recognition", CRC Press, 1996, pp. 69-72, 1996, p. 69.

Rahnamayan, et al., "Opposition-Based Differential Evolution (ODE) with Variable Jumping Rate", IEEE publication, 2007, pp. 81-88.

Reeves, "Kluwewer's International Series—Handbook of Metaheuristics", WebSite Link: http://sci2s.ugr.es/docencia/algoritmica/GeneticAlgorithms.pdf, 2003, 28 pages.

Sen, "An Improved Catastrophic Genetic Algorithm and Its Application in Reactive Power Optimization", Nov. 2010, pp. 306-312.

Skolicki, et al., "The Influence of Migration Sizes and Intervals on Island Models", Jun. 29, 2005, 8 pages.

Vertanen, "Genetic Adventures in Parallel: Towards a Good Island Model under PVM", 1998, 12 pages.

(56) References Cited

OTHER PUBLICATIONS

Welten, "Parallelization of Evolutionary Algorithms", Swiss Federal Institute of Technology Zurich, Systems Optimization Group—Thesis, Spring 2008, pp. 1-51.

Xin-Rong, et al., "Application of Catastrophic Adaptive Genetic Algorithm to Reactive Power Optimization of Power System", Artificial Intelligence and Computational Intelligence (AICI), 2010 International Conference, Oct. 23-24, 2010, 2 pages.

Yu, et al., "A Catastrophe Based-Parallel Genetic Algorithm", Systems Engineering Institute of Xi'an Jiaotong University, Xi'an710049), Jul. 2001, 4 pages.

SPECULATIVE ASYNCHRONOUS SUB-POPULATION EVOLUTIONARY COMPUTING

RELATED APPLICATIONS

This application is a Continuation of, and claims the priority benefit of, U.S. application Ser. No. 13/174,441 filed Jun. 30, 2011.

BACKGROUND

Embodiments of the inventive subject matter generally relate to the field of metaheuristic optimization computing, and, more particularly, to speculating in metaheuristic optimization computing.

Software tools employ metaheuristic optimization algorithms to solve optimization problems. Examples of metaheuristic optimization algorithms include evolutionary algorithms (e.g., genetic algorithm, differential evolution), ant colony optimization algorithms, simulated annealing algorithms, etc.

Evolutionary algorithms use techniques loosely based on Darwinian evolution and biological mechanisms to evolve solutions to tough design problems. A software tool that implements an evolutionary algorithm starts with a randomly generated population of solutions, and uses sexual recombination, crossover, mutation, and the Darwinian principles of natural selection to create new, more fit solutions. Evolutionary algorithms have been deployed in many aspects of research and development, and have generated human-competitive solutions to a wide range of problems. Within International Business Machines Corporation (IBM), (SNAP) has been successfully applied to I/O circuit design for Power7/7+, scan-chain routing, the high performance computing (HPC) bidding process, signal integrity for z-series buses, and compiler flag tuning. String-based genetic algorithms are very useful for exploring large, complex design spaces where other methods (e.g., linear regressions) fail.

SUMMARY

Embodiments include a method that receives fitness values for a first generation of a first sub-population of a plurality of sub-populations. A population of candidate solutions for an optimization problem was previously divided into the plurality of sub-populations. The population of candidate solutions was created for an iterative computing process in accordance with an evolutionary algorithm to identify a most fit candidate solution for the optimization problem. The method determines that the first generation of the first sub-population does not satisfy a termination criterion for the iterative computing processing. The method determines that the first generation corresponds to a later iteration of the iterative computing process than a second generation of a second sub-population of the plurality of sub-populations. The method determines that a difference between the first generation and the second generation does not exceed a termination speculation threshold. The method generates a third generation of the first sub-population responsive to said determining that the difference between the first generation and the second generation does not exceed the termination speculation threshold. Generating the third generation of the first sub-population is based, at least in part, on the fitness values.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
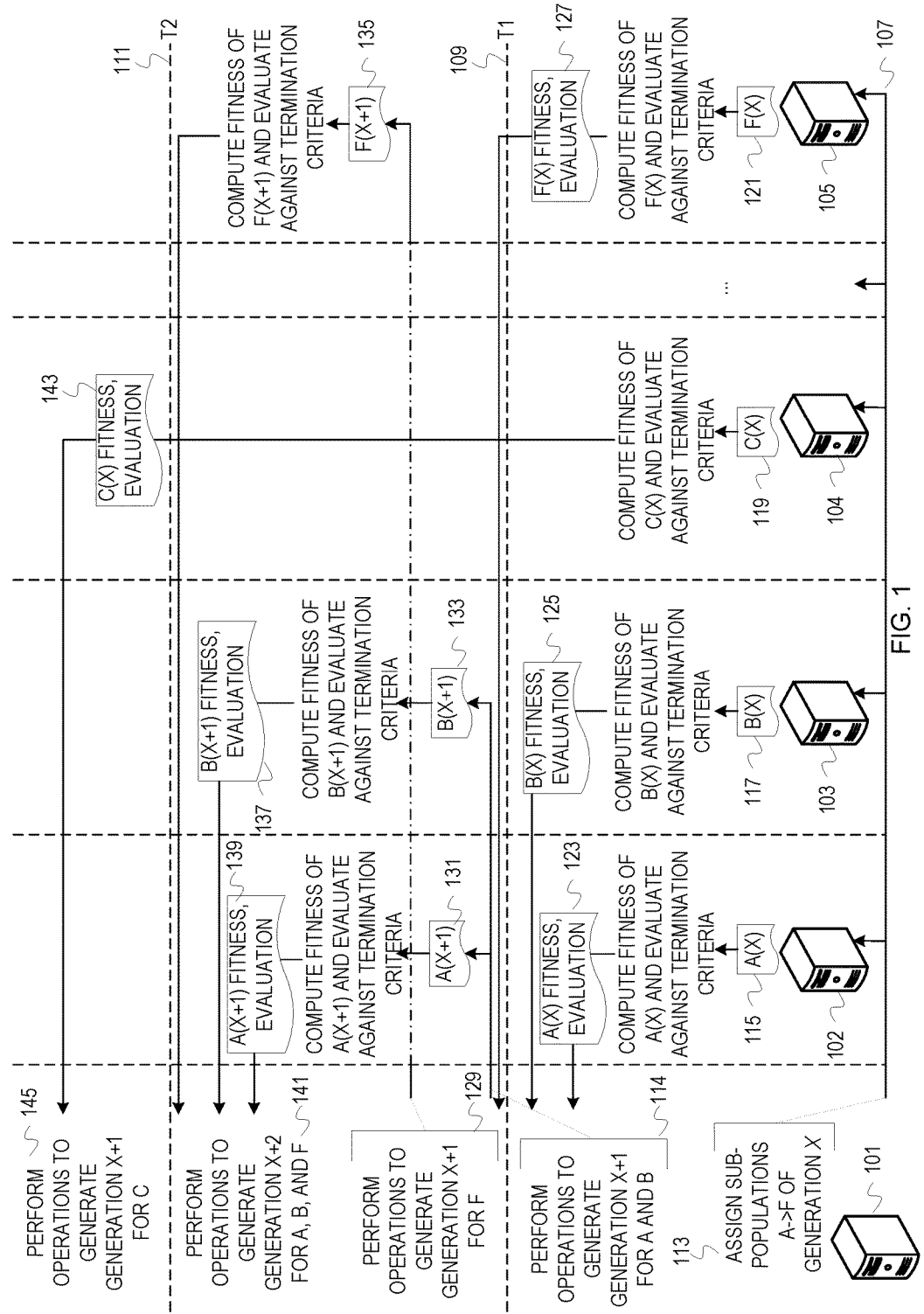
FIG. 1 illustrates an example system running a software tool implementing evolutionary computing with termination speculation.

The description that follows includes example systems, methods, techniques, instruction sequences and computer program products that embody techniques of the present inventive subject matter. However, it is understood that the described embodiments may be practiced without these specific details. For instance, although examples refer to machines, embodiments of the inventive subject matter can be implemented in a virtualization environment. For example, sub-populations can be assigned to different virtual machines that can be supported by a single machine. As another example, sub-populations can be assigned to different cores in a multi-core environment. In other instances, well-known instruction instances, protocols, structures and techniques have not been shown in detail in order not to obfuscate the description.

Terminology

Literature about evolutionary computing uses a large variety of terminology. In some cases, terms are used ambiguously. Genetic algorithm literature sometimes uses the terms "population" and "generation" ambiguously. In the claims, the terms "population" and "generation" are not used ambiguously. A software tool or computer program that implements an evolutionary algorithm to solve an optimization problem iteratively creates candidate solutions, computes fitness values for the candidate solutions, and evaluates the candidate solutions to determine whether a next iteration should begin. The candidate solutions created at a particular iteration are referred to as a generation of candidate solutions or generation. In the claims, the term "population" encompasses candidate solutions across generations. Initially, the population includes the initial generation of candidate solutions. As each generation is created, the new generation becomes a part of the population. The claims will also use the term "iteration." Iteration is used to refer to a stage in the computing process, instead of generation. In the claims, generation will be limited to describing the candidate solutions created at an iteration. The term "process" is often used to refer to an instantiation of a sequence of machine-readable program instructions. The claims will use "evolutionary computing process" to refer to the aggregate work performed by computing resource units or nodes for a particular run of a tool or program that implements an evolutionary algorithm. In the claims, "evolutionary computing process" is not limited to a single instance of executing instructions. The term "node" or "computing node" is used herein to refer to a computing resource unit. Examples of a node include a computer, a mobile device, a virtual machine, a core in a multi-core environment, a processor in a multi-processor environment, a group of computers in a cluster, a group of computers in a grid, etc.

Overview

Evolutionary computing evaluates a population of candidate solutions ("individuals") to obtain fitness values. The fitness values can be used for ranking input to a selective process. The selective process informs creation of a next generation of candidate solutions. Generally, the entire population is evaluated based on values from a fitness function before work begins on the next generation. This dependence on the prior generation creates an efficiency issue when there is considerable variation in the time to evaluate an individual. This is often the case with long simulations running on a pool of (possibly shared) heterogeneous machines. The problem is more acute when hardware failures and retries are considered. The entire process is held up until the very last individual of the population has been successfully evaluated.

Preventing a small number of slow-running individuals and/or intermittent failures from stalling the generation and evaluation of other individuals can reduce the time per generation and increase the efficiency of use of available computing nodes. An evolutionary computing technique that uses speculation can prevent this stalling without removing individuals from the gene pool, and while preserving repeatability of evolutions.

A computer program, hardware, and/or tool implementing evolutionary computing with multiple nodes can leverage speculation to overcome stalls and/or failures. As an example, a primary node ("evolution manager") can generate an initial generation of a population and succeeding generations. The evolution manager divides the population into sub-populations, and tasks a different one of several nodes to apply a fitness function to the corresponding sub-population. The several nodes compute fitness values for each generation of the sub-populations in parallel, and report results back to the evolution manager. Nevertheless, the results are not returned concurrently or synchronously because the several nodes have different capabilities (e.g., different processors, different component configurations, etc.). Instead of waiting for results for all sub-populations of a generation, the evolution manager can speculate to proceed with generating a next generation of a sub-population independent of other sub-populations. The evolution manager can implement one or more of three different speculation techniques. First, the evolution manager can speculate that none of the sub-populations will satisfy the termination criterion for the evolutionary algorithm. As long as a sub-population is not dependent on migrants from a neighboring sub-population, then the sub-population can advance to the next generation. Second, the evolution manager can allow for speculation of migrants. Instead of a sub-population being stalled by a slower sub-population that will provide the migrants, the faster sub-population can proceed with speculative migrants. Third, the evolution manager can prod a node that is falling too far behind the other nodes to speculatively rank the individuals of its sub-population. The speculative ranking can be used to create a next generation for the slow/stalled sub-population, and decrease the gap with the other sub-populations.

Illustrations of Some Embodiments

FIG. 1 illustrates an example system running a software tool implementing evolutionary computing with termination speculation. FIG. 1 depicts a system with five machines 101-105 communicatively coupled via a network 107. FIG. 1 also depicts a dashed line 109 and a dashed line 1n. The dashed line 109 represents a time T1, and the dashed line 1n represents a time T2. For the illustration of FIG. 1, the machines 102-105 are presumed to possess the capability to apply a fitness function to candidate solutions, and the capability to evaluate the fitness values computed from applying the fitness function. The illustration presumes that the machine 101 possesses the capability to create generations of a population. The presumptions are made because a wide variety of implementations are possible. Addressing each of the possible implementations would obfuscate the description of the inventive subject matter. For instance, the capability to evaluate candidate solutions against a termination criterion could be instantiated on a single node that manages all other nodes. The capability to evaluate candidate solutions could also be instantiated on a few machines tasked with evaluating fitness values created by machines 102-105, which are then communicated to the machine 101. An example configuration of machines is illustrated in FIG. 2.

Figure 2:
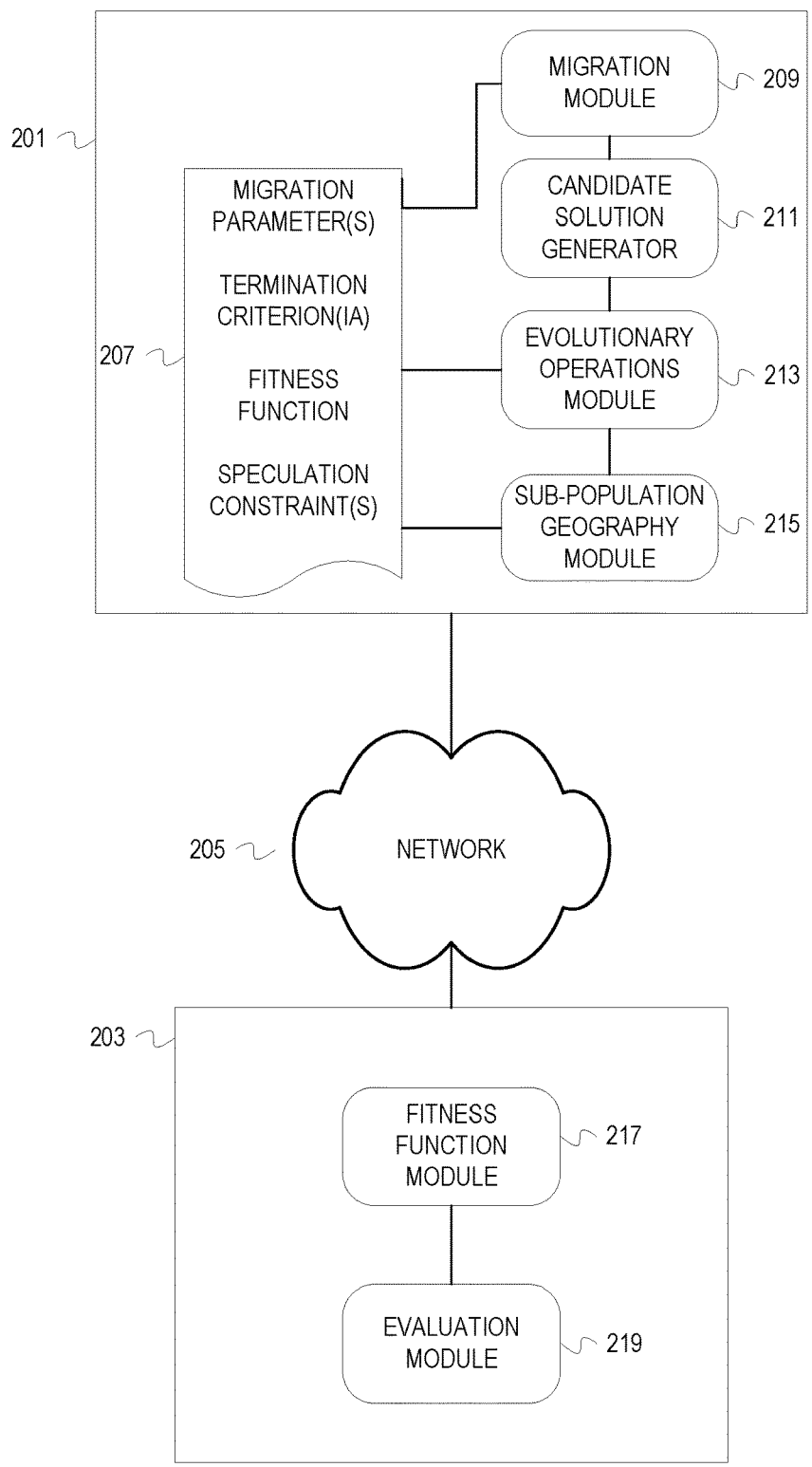
FIG. 2 illustrates an example configuration of two machines in a system implementing evolutionary computing with speculation.

FIG. 2 illustrates an example configuration of two machines in a system implementing evolutionary computing with speculation. In FIG. 2, a machine 201 is communicatively coupled with a machine 203 via a network 205. The machine 201 is depicted with several modules, which represent functionality that can be implemented with any combination of software and hardware. The machine 203 is also depicted with a few modules, which also represent functionality that can be implemented with any combination of hardware and software.

The machine 201 hosts the following modules: a migration module 209, a candidate solution generator 211, an evolutionary operations module 213, and a sub-population geography module 215. The machine 201 also hosts configuration data 207. The configuration data 207 may be implemented as a single file, multiple files, records in a database, etc. The configuration data 207 may be stored in any of a variety of memory hardware (e.g., volatile memory, non-volatile memory), and may be obtained locally or remotely.

The configuration data 207 is depicted as including migration parameter(s), termination criterion(ia), a fitness function, and speculation constraint(s). Migration parameters are parameters for controlling/influencing migration. Examples of the migration parameter(s) include rate of migration, which neighbor provides migrants, whether migration is periodic or iterative, an initial iteration to begin migration, etc. Migration parameters can also introduce some randomization into migration, and impose a policy of no duplicates. In other words, a migration parameter may forbid a migrant candidate solution that is a duplicate of another candidate solution in the destination sub-population. Migration parameters can also define how migrants are selected (e.g., randomly or based on fitness), whether migrants are placed in a same or later generation, whether a migrant is copied or moved, and which candidate solutions are replaced by migrants. A migrant candidate solution can replace a randomly selected candidate solution or a least fit candidate solution. The termination criterion indicates a condition for stopping an evolutionary computing process from proceeding to a next iteration. A fitness function is a function defined for an optimization problem to yield one or more fitness values for a candidate solution. A fitness function can be defined for an entire population for an optimization problem, or different fitness functions can be defined for different sub-populations. The fitness value(s) represents a degree of fitness for the optimization problem. The speculation constraint(s) indicates a constraint on performing speculation. To prevent or reduce incurring additional work from speculation, one or more constraints on speculation can be defined. Examples of speculation constraints include distance between generations/iterations, number of speculative migrants, migrant transit time, etc. A speculation constraint can require a minimum number or percentage of a current generation to be complete before a sub-population can advance to a next generation. A speculation constraint can specify that speculation be restricted until neighboring sub-populations receive their migrants.

The migration module 209 implements operations for migration. The migration module 209 determines when to begin migration and controls migration rate among sub-populations in accordance with the migration parameter(s).

The candidate solution generator 211 generates candidate solutions at each iteration of the evolutionary computing process. Initially, the candidate solution generator 211 can create random candidate solutions for an optimization problem. The candidate solution generator 211 can also create an initial population with one or more seed solutions. The candidate solution generator 211 coordinates with the evolutionary operations module 213 to generate successive generations. The evolutionary operations module 213 implements recombination, crossover, mutation, cataclysms, etc.

The sub-population geography module 215 determines or specifies geography for an evolutionary computing processing. The geography of sub-populations informs migration. The geography of sub-populations indicates which sub-populations neighbor each other. Neighboring sub-populations can source or provide migrants. The sub-population geography module 215 can define geography in accordance with configuration information (e.g., entered by a user, defined in a file, etc.). The sub-population geography module 215 can also define geography based on performance capabilities of nodes involved in an evolutionary computing process. For example, the sub-population geography module can define a geography that restricts neighbors to computing nodes having equivalent computing capabilities.

The machine 203 hosts a fitness function module 217 and an evaluation module 219. The fitness function module 217 computes fitness values for candidate solutions in accordance with a fitness function for an optimization problem. The evaluation module 219 evaluates the fitness values against one or more termination criteria to determine whether the one or more termination criteria are satisfied.

Implementations of the modules as depicted in FIG. 2 are not necessary. The separate modules are to illustrate examples. For instance, the functionalities of the candidate solution generator 211 and evolutionary operations module 213 are depicted as separate merely as an example illustration. A single functional entity (e.g., software tool, application specific integrated circuit, etc.) can implement the functionality of the candidate solutions generator 211 and the evolutionary operations module 213. Indeed, embodiments can partition and/or unify the functionality represented by the modules 209, 211, 213, 215 in any number of ways. The functionality represented by the modules can also be distributed across nodes or concentrated on a node in different ways. For instance, a management node can implement the functionality represented by the modules 209, 211, 213, 215, and 217; while one or more other nodes implement the functionality of module 219. As another example, a management node can implement the functionality represented by the modules 209, 211, 213, and 215; a separate set of nodes can implement the functionality represented by the fitness function module 217; and a different set of nodes can implement the functionality of the evaluation module 219.

Returning to FIG. 1, the machine 101 assigns sub-populations A→F of a generation X to the machines 102-105 as represented by operation 113. Each of the machines 102-105 applies a fitness function for an optimization problem to the assigned generation X of the sub-populations. Processing of sub-populations D→E and the corresponding machines are not illustrated because of space constraints. The machine 102 computes fitness values for A(X) 115. The notation A(X) signifies generation X of the sub-population A. The machine 102 then evaluates the computed fitness values against termination criteria. Afterwards, the machine 102 sends a communication 123 to the machine 101. The communication 123 indicates the fitness value for A(X) and a result of the evaluation. The machine 103 performs similar operations on B(X) 117. The machine 103 computes fitness values for B(X) 117. The machine 103 then evaluates the computed fitness values against termination criteria. The machine 103 then sends a communication 125 to the machine 101. The communication 125 indicates the fitness value for B(X) and a result of the evaluation. For this illustration, both machines 102, 103 communicate the fitness values and evaluation results before the time T1 represented by the dashed line 109. Also, the evaluations results indicate that A(X) and B(X) do not satisfy the termination criteria.

After receiving the communications 123, 125, the machine 101 performs operations to generate generation X+1 for sub-populations A and B (114). Proceeding with evolutionary operations for the sub-populations A and B means that the machine 101 speculates that generation X of the sub-populations C→F will not satisfy the termination criteria. At some time soon after T1, the machine 101 sends A(X+1) 131 and B(X+1) 133 to the machine 102 and the machine 103, respectively. Thus, speculation with respect to the evaluation results allows the sub-populations A and B to advance and not be hampered by the other sub-populations.

FIG. 1 depicts machine 104 as still processing C(X) 119 at T1. The machine 107 computes fitness values for F(X) 121, and evaluates the fitness values against the termination criteria. Soon after T1, the machine 107 sends a communication 127, which indicates the fitness values for F(X) 121 and evaluation results, to the machine 101. After receiving the communication 127, the machine 101 performs operations to generate generation X+1 for sub-population F (129). While the machines 102 and 103 respectively operate on A(X+1) and B(X+1), the machine 101 sends F(X+1) 135 to the machine 107. During this time, the machine 104 is still processing C(X). A variety of reasons can lead to the sub-population C lagging behind the other sub-populations. The machine 104 may have less processing power than the other machines. The machine 104 may have stalled on a candidate solution. The machine 104 may have experienced a failure. Regardless of the reason, speculation does not allow the lagging sub-population to idle the machines 102, 103 and 105.

The machines 102 and 103 finish computing fitness values for A(X+1) and B(X+1) and evaluating those fitness values against termination criteria prior to time T2 represented by the dashed line 111. The machine 102 sends a communication 139, which indicates the fitness values for A(X+1) and evaluation results, to the machine 101 prior to T2. The machine 103 also sends a communication 137, which indicates the fitness values for B(X+1) and evaluation results, to the machine 101 prior to T2. Similarly, the machine 107 also finishes computing fitness values for F(X+1) and evaluating those fitness values against termination criteria prior to time T2. The machine 107 then sends a communication 135, which indicates the fitness values for F(X+1) and evaluation results, to the machine 101 prior to T2. After receiving the communications 135, 137, and 139, the machine 101 performs evolutionary operations to generate generation X+2 for sub-populations A, B, and F.

The machine 104 does not finish computing fitness values for C(X) and evaluating those fitness values until after T2. Soon after T2, the machine 104 sends a communication 143 to the machine 101. The communication 143 indicates the fitness values for C(X) and the evaluation results. After receiving the communication 143, the machine 101 performs evolutionary operations to generate generation X+1 for the sub-population C, assuming the termination criteria have not been satisfied by C(X). Instead of the machines 102, 103, and 105 remaining idle until the machine 104 finished computing fitness values and evaluating C(X), the machines 102, 103, 105 were able to advance 1-2 generations past generation X. If a sub-population advances to a speculation threshold, the corresponding machine can be tasked with helping advance the lagging sub-population. For example, candidate solutions from the lagging sub-population can be passed to the machine handling the sub-population that has reached a termination speculation limit. Or the machine handling the advanced sub-population can be tasked with a different job while the slower sub-population catches up. A variety of resource utilization techniques and/or load balancing techniques can be employed with the inventive subject matter.

For the illustration of FIG. 1, it was assumed that the termination criteria were not satisfied by a slower sub-population. In addition, other factors, such as migration, were not considered. As stated earlier, speculation can allow sub-populations to advance even when candidate solutions migrate between sub-populations that advance at different rates. As stated earlier, a speculative migrant candidate solution can be generated for a faster sub-population. FIGS. 3-6 depict flowcharts of example operations for speculation in an evolutionary computing process that implements migration.

Figure 3:
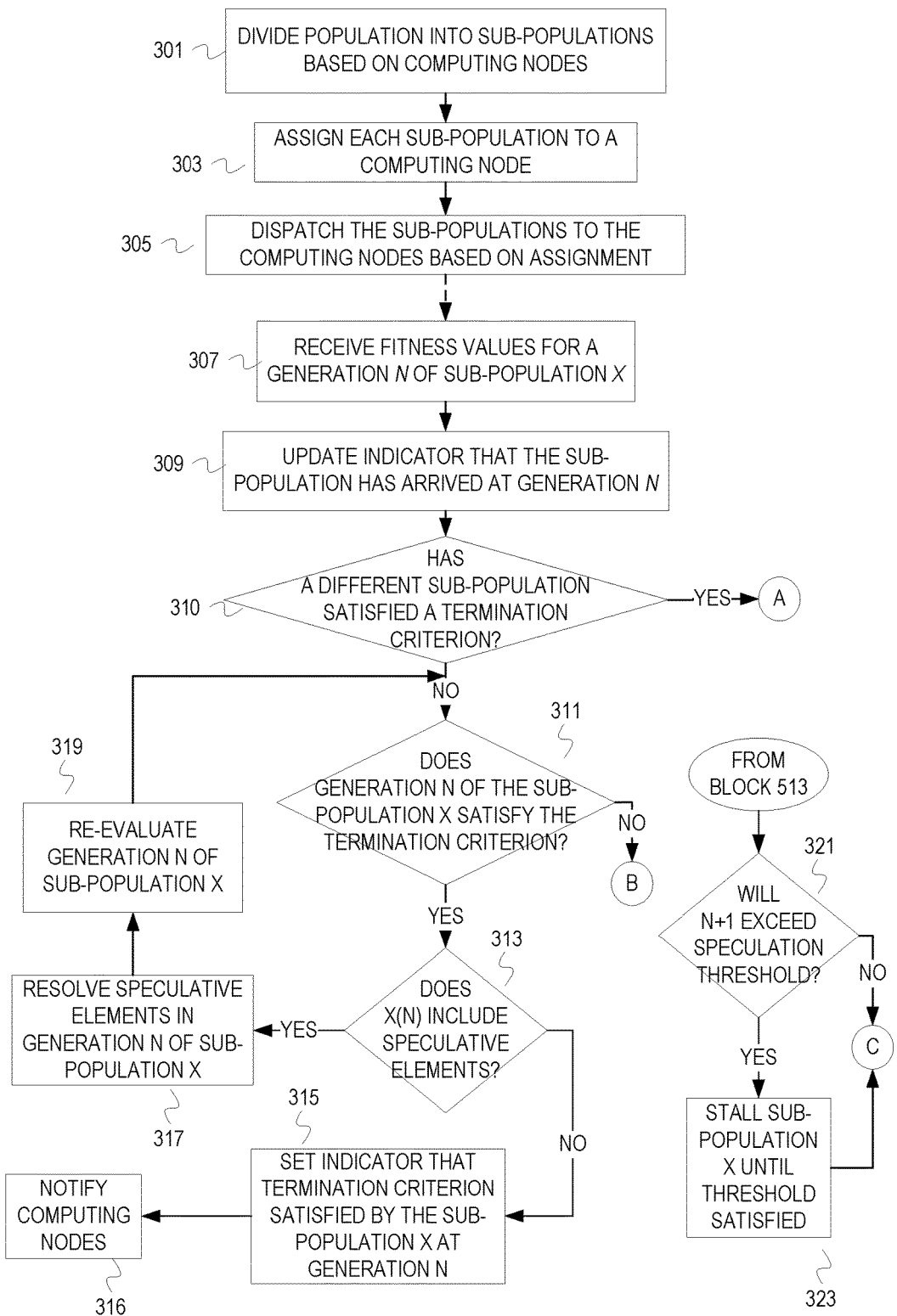
FIG. 3 depicts a flowchart of example operations for speculative evolutionary computing across nodes.

FIG. 3 depicts a flowchart of example operations for speculative evolutionary computing across nodes. At block 301, a population of candidate solutions is divided into sub-populations based on computing nodes. For t candidate solutions and s computing nodes, the population can be divided into t/s sub-populations. Division of a population into sub-populations can also be skewed or weighted towards assigning more candidate solutions to computing nodes with greater capabilities. At block 303, each sub-population is assigned to a computing node. At block 305, the sub-populations are dispatched to the computing nodes based on the assignments. For example, a managing node can transmit data that embodies the sub-populations to the corresponding nodes. In another implementation, a managing node can pass or transmit references to data that embodiments the sub-populations of candidate solutions. The dashed line from block 305 to block 307 represents a disruption in the flow. The managing node may wait for communications from other nodes involved in the evolutionary computing process. The managing node may assign itself a sub-population and/or perform administrative tasks (e.g., monitoring the other nodes, ensure compliance with a resource allocation schedule of the nodes, etc.).

For the implementation illustrated in FIGS. 3-6, a node that generates candidate solutions also evaluates candidate solutions with fitness values computed by other nodes. Hence, a node that computes fitness values, will communicate the fitness values back to the node that handles evaluation, which in this case is the managing node that dispatched the sub-populations. This managing node tracks iterations or progress of each of the sub-populations through the evolutionary computing process. At block 307, fitness values for a generation N of a sub-population X are received. At block 309, an indicator is updated to indicate that the sub-population X has arrived at generation N. For example, the managing node increments a counter for the sub-population X.

At block 310, it is determined whether a different sub-population has satisfied a termination criterion for the evolutionary computing process. Since sub-populations are not forced to synchronize at each generation, sub-populations can advance beyond a terminating generation. To prevent or reduce the work on a speculative generation beyond a terminating generation, implementation can check whether the termination criterion have been satisfied at different times within an evolutionary computing process. In this example implementation, a check is made each time a sub-population arrives at a generation. If a sub-population has satisfied the termination criterion, then control flows to block 401 of FIG. 4. Otherwise, control flows to block 311.

At block 311, it is determined if generation N of the sub-population X satisfies the termination criterion. If the generation N of the sub-population X does not satisfy the termination criterion, then control flows to block 501 of FIG. 5. If the generation N of the sub-population X satisfies the termination criterion, then control flows to block 313.

If the generation N of the sub-population X was determined to satisfy the termination criterion at block 311, then it is determined if the generation N of the sub-population X includes speculative elements at block 313. A generation of a sub-population may have speculative elements from a speculatively created migrant candidate solution and/or speculative ranking of candidate solutions. The details of speculative ranking and speculative migrants will be discussed in FIGS. 6 and 8. The effect of speculative ranking and/or a speculative migrant can carry through multiple generations. Implementations can track these speculative elements with various techniques. As one example, implementations can tag candidate solutions impacted by speculative ranking and/or a speculative migrant. As another example, implementations can maintain a central data structure that indicates speculative elements at each generation of each sub-population. If the generation N of the sub-population does not include speculative elements, then control flows to block 315. If the generation N of the sub-population includes speculative elements, then control flows to block 317.

At block 315, an indicator that the termination criterion is satisfied by the generation N of the sub-population X is set. For instance a flag or bit is set in a data structure to indicate that at least one candidate solution in generation N of sub-population X satisfied the termination criterion.

At block 316, the computing nodes that were not assigned the sub-population X are notified that the termination criterion is satisfied. Notifying the other computing nodes allows nodes working on generations beyond the terminating generation to halt working. Fitness values and candidate solutions in generations beyond the terminating generation can be stored for use in other runs of the evolutionary computing process for the optimization problem. Nodes processing earlier generations of sub-populations can proceed with their work until they arrive at generation N.

If the generation N of sub-population X was determined to include speculative elements, then the speculative elements are resolved in generation N of sub-population X at block 317. If a speculative element resulted from speculative ranking, then the actual ranking is determined. For instance, generation N of the sub-population X may include a candidate solution generated based on speculative ranking of candidate solutions in generation N−1 of sub-population X. The actual ranking may now be available or additional resources can be dispatched to expedite obtaining the actual ranking of generation N−1 for sub-population X. If a speculative element resulted from a speculatively created migrant, then the speculatively created migrant can be replaced with the actual migrant. Again, resources can be allocated to expedite replacement of the speculative migrant with the actual migrant.

At block 319, generation N of the sub-population X with the resolved speculative elements is re-evaluated. Resolution of speculative elements may change the result of evaluation, although not necessarily. Control returns from block 319 to block 311.

Figure 5:
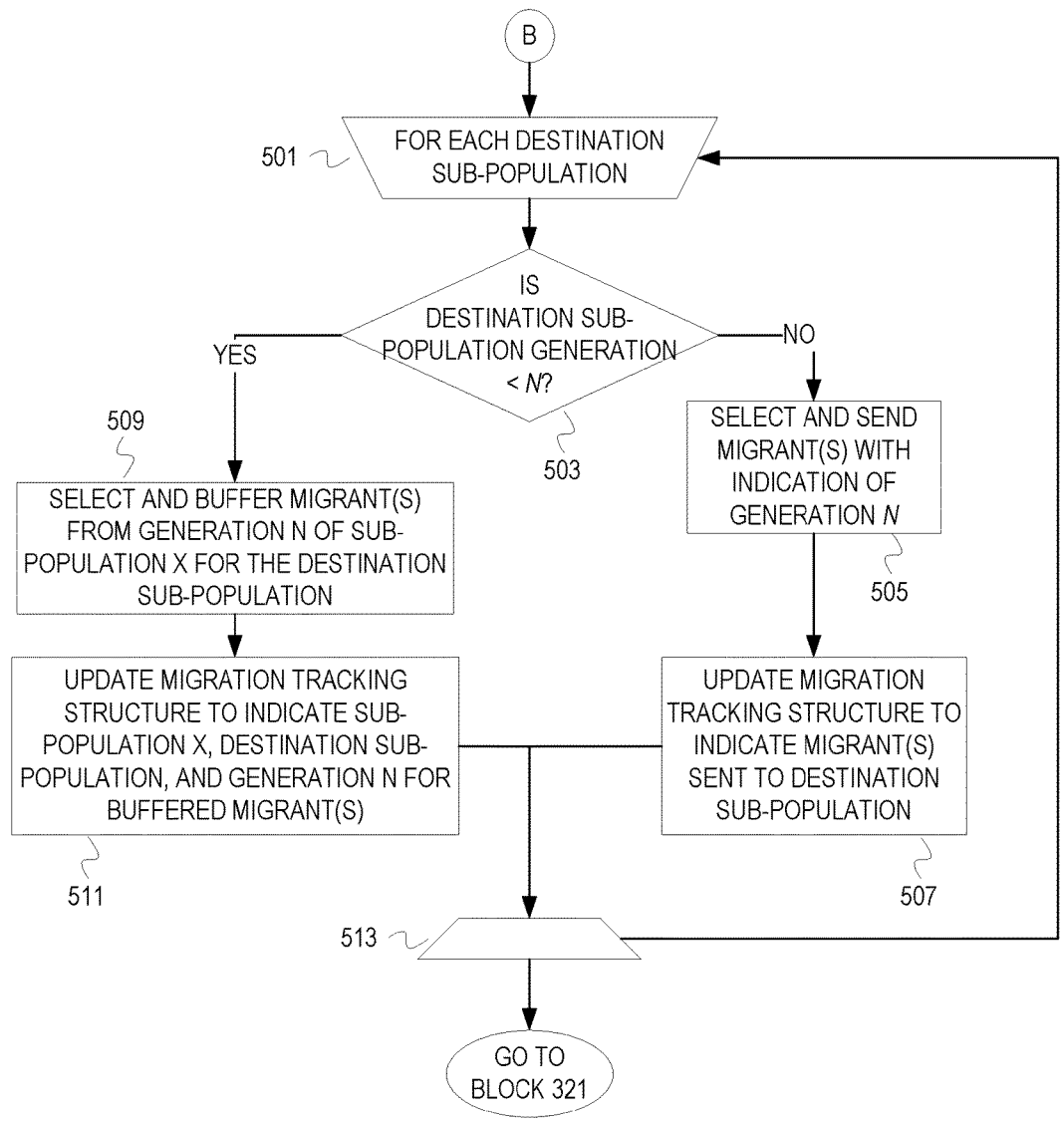
FIG. 5 depicts a flowchart of example operations involving migrations that continues from block 311 of FIG. 3.

From block 311, the example path of operations flows through FIG. 5 and returns to block 321. At block 321, it is determined if speculatively advancing the sub-population X to generation N+1 will exceed the termination speculation threshold. Although speculating that other slower sub-populations will not satisfy a termination criterion ("termination speculation") can increase resource utilization and achieve a result faster, overly aggressive termination speculation can increase the possibility of expending resources on sub-population generations beyond a terminating generation. The speculation threshold can regulate the termination speculation and reduce the risk of consuming resources to a point that outweighs the gains from termination speculation. If advancing sub-population X to generation N+1 will not exceed the speculation threshold, then control flows to block 501 of FIG. 5. If the advancing based on termination speculation will exceed the speculation threshold, then the sub-population X is stalled until the threshold is satisfied at block 323. Embodiments are not limited to stalling a faster sub-population, though. Embodiments may utilize other variables to determine whether to stall a faster sub-population. A confidence metric can modify the threshold. For instance, earlier generations can advance more aggressively based on high confidence that early generations will not satisfy the termination criterion. In addition, embodiment can redeploy the computing node handling the faster sub-population to help with a slower sub-population or handle a different task, perhaps not related to the evolutionary computing process.

Figure 4:
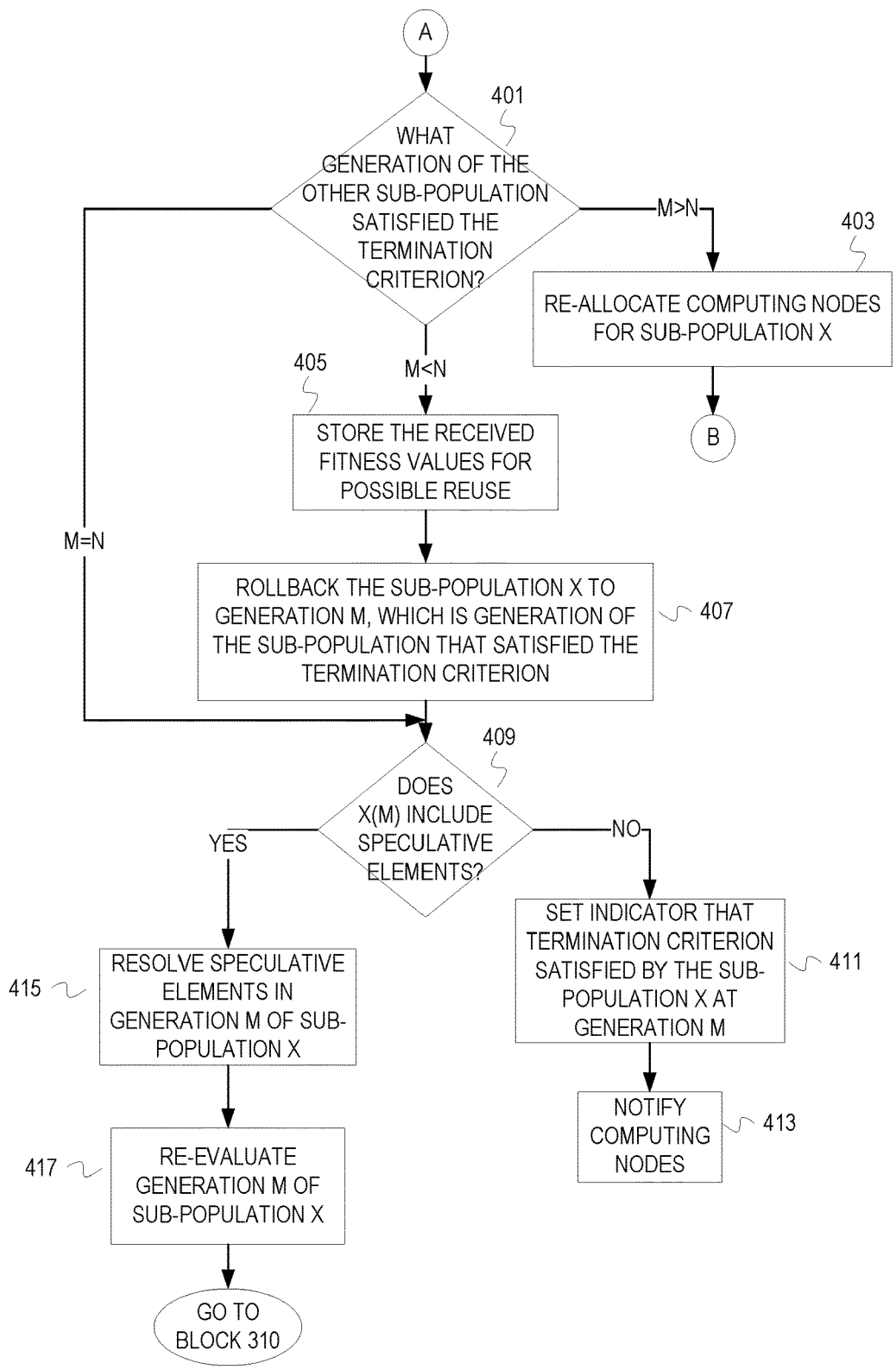
FIG. 4 depicts a flowchart of example operations that continues from FIG. 3 when a different sub-population satisfies the termination criterion.

FIG. 4 depicts a flowchart of example operations that continues from FIG. 3 when a different sub-population satisfies the termination criterion. If it was determined at block 310 of FIG. 3 that a different sub-population satisfied the termination criterion, then control flowed to block 401 of FIG. 4. At block 401, the generation of the other sub-population that satisfied the termination criterion is determined. Signifying the terminating generation as generation M, if generation M is equal to generation N, then control flows to block 409. If generation M is earlier than generation N, then control flows to block 405. If generation M is later than generation N, then control flows to block 403.

At block 403, computing nodes are re-allocated for the sub-population X, and any other sub-populations behind generation M. The computing nodes are re-allocated to expedite processing of the slower sub-population. Embodiments, however, are not required to re-allocate computing nodes. Computing nodes can remain idle until slower sub-populations catch up, can resolve speculative elements, be re-allocated to other tasks, etc. Control flows from block 403 to block 501 of FIG. 5.

At block 405, the received fitness values are stored for possible reuse. The candidate solutions may naturally occur in later generations. In those cases, the already computed fitness values can be utilized. In other words, resources can be leveraged for later iterations. Embodiments, however, are not required to reuse fitness values.

At block 407, the sub-population X is rolled back to the generation M. For instance, a managing node can access a store of previous generations based on an identifier of the sub-population X, and loading generation M of the sub-population X.

At block 409, it is determined if generation M of the sub-population X includes speculative elements. Coincident with loading the generation M of the sub-population X, a speculation tracking structure can be accessed to determine if generation M of sub-population X includes speculative elements. If the generation M of the sub-population does not include speculative elements, then control flows to block 411. Otherwise, control flows to block 415.

At block 415, the speculative elements are resolved in generation M of sub-population X. If a speculative element resulted from speculative ranking, then actual ranking is determined. For instance, generation M of the sub-population X may include a candidate solution generated based on speculative ranking of candidate solutions in generation M−1 of sub-population X. The actual ranking may now be available or additional resources can be dispatched to expedite obtaining the actual ranking of generation M−1 for sub-population X. If a speculative element resulted from a speculatively created migrant, then the speculatively created migrant can be replaced with the actual migrant. A speculative element may be result direct from speculation (e.g., an offspring of a speculative migrant or an offspring with a parent candidate solution having an incorrect speculative ranking). A speculative element may also result indirectly (e.g., a candidate solution removed by at least one generation from the generation with speculative ranking or a speculative migrant).

At block 417, generation M of the sub-population X is re-evaluated. Resolution of speculative elements may change the result of evaluation, although not necessarily. Control flows from block 417 back to block 310 of FIG. 3.

At block 411, an indicator that the termination criterion is satisfied by the generation M of the sub-population X is set. At block 413, the computing nodes that were not assigned the sub-population X are notified that the termination criterion is satisfied.

FIG. 5 depicts a flowchart of example operations involving migrations that continues from block 311 of FIG. 3. The path of operations arrives at block 501 after it has been determined that the termination criterion has not yet been satisfied. The operations depicted in FIG. 5 handle migration between sub-populations in a speculative environment that allows for asynchronous sub-population evolution. These operations begin at block 501 for each destination sub-population. If migration does not occur at generation N of the sub-population X, then the operations are not performed and control flows to block 513. If the generation N of the sub-population X is supplying at least one candidate solution or migrant to at least one neighboring sub-population, then the operations begin at block 503.

At block 503, it is determined if the destination or receiving sub-population is at a generation earlier than generation N. If the destination sub-population is behind the sub-population X, then control flows to block 509. If the destination sub-population is at the same or a later generation, then control flows to block 505.

At block 509, a migrant(s) is selected and buffered from generation N of the sub-population X for the destination sub-population. Embodiments can maintain a separate memory area, file or record for buffered migrants waiting for a destination sub-population to arrive at the appropriate generation. Embodiments can also maintain a reference to a migrant(s) with data that indicates the destination sub-population and appropriate generation. When the destination sub-population arrives at the generation N, then the migrant(s) is inserted and the tracking structure updated accordingly.

At block 511, a migration tracking structure is updated to indicate the sub-population X, the destination sub-population, and the generation N for the buffered migrant(s). Coincident with creating a generation N for a destination sub-population, the migration tracking structure is accessed to determine whether any migrants are buffered for generation N of the destination sub-population as generation N of the destination sub-population is being created or after it has been created. Control flows from block 511 to block 513.

If the destination sub-population is at generation N or later, then a migrant(s) from generation N of the sub-population X is selected and sent to the destination sub-population. An indication of the generation can also be communicated. Sending a migrant can involve transmitting the migrant data, transmitting a reference to the migrant data, passing a pointer or identifier of the migrant data, etc.

At block 507, the migration tracking structure is updated to indicate that the migrant(s) was sent to the destination sub-population. Control flows from block 507 to block 513.

At block 513, it is determined if each destination sub-population has been processed. If not, control returns back to block 501. If so, then control flows back to block 321 of FIG. 3.

Figure 6:
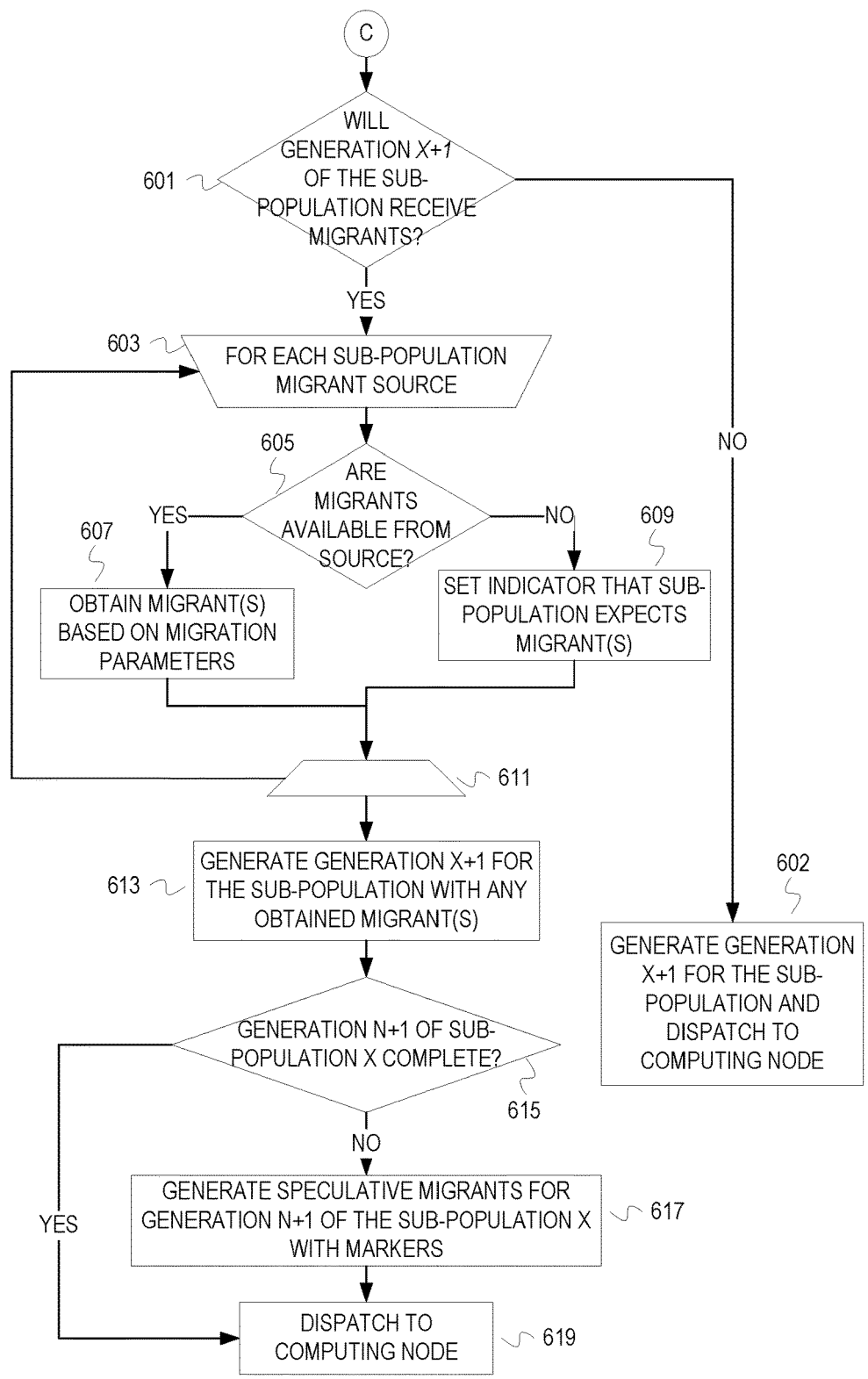
FIG. 6 depicts an example flowchart of operations that include migration speculation and that continue from block 310 of FIG. 3.

FIG. 6 depicts an example flowchart of operations that include migration speculation and that continue from block 310 of FIG. 3. Coincident with creation of generation N+1 for the sub-population X, it is determined if generation N+1 of the sub-population X will receive a migrant(s) at block 601. If X(N+1) will receive a migrant(s), then control flows to block 603. If X(N+1) will not receive a migrant, then control flows to block 602.

At block 602, generation N+1 for the sub-population X is generation and dispatched to the appropriate computing node.

At block 603, operations begin for each sub-population migrant source.

At block 605, it is determined if a migrant(s) is available from the source. For example, migration tracking data is accessed by the sub-population X. The migration tracking structure will indicate whether a migrant is available (e.g. has been buffered) from the source. If a migrant(s) is not available, then control flows to block 609. If a migrant(s) is available, then control flows to block 607.

At block 607, a migrant(s) is obtained based on migration parameters. For example, the migration parameters can indicate how many migrants will be provided from a particular source. The migration parameter can indicate that a migrant candidate solution is to be selected randomly. Control flows from block 607 to block 611.

At block 609, an indicator is set that indicates the sub-population X expects a migrant(s). For example, the migration tracking data is updated with an indication that generation N+1 of the sub-population X expects a given number of migrants that satisfy migration parameters. Embodiments can also be configured to skip migration if a migration source is not ready. Control flows to block 611.

At block 611, the flow returns to block 603 if there is an additional migrant source sub-population and continues to block 613 if there is no additional migrant source sub-population.

At block 613, generation N+1 for the sub-population X is generated with evolutionary operations, and the obtained migrant(s) is inserted into the generation N+1 of the sub-population X. Inserting of migrant candidate solutions can vary based on a chosen migration strategy. The migrant(s) may replace least fit candidate solutions, randomly selected candidate solutions, last generated candidate solutions, etc. Embodiments may create X(N+1) with slots for migrant candidate solutions. For instance, a node may be aware that X(N+1) should have 20 candidate solutions and that 4 migrant candidate solutions will be accepted. Instead of generating 20 candidate solutions and replacing four of them, the node can generate 16 candidate solutions.

At block 615, it is determined if generation N+1 of the sub-population X is complete. Some or none of the expected migrants may not have been available. For instance, a source sub-population may not have arrived at generation N yet. As another example, a source sub-population may process and send migrants incrementally (e.g., as each complete evaluation). If X(N+1) is not complete, then control flows to block 617. If X(N+1) is complete, then control flows to block 619.

At block 617, one or more speculative migrant(s) are generated to complete generation N+1 of the sub-population X. Data is recorded to indicate that the migrants are speculative and/or to indicate that the generation N+1 of the sub-population X is impacted by use of a speculative migrant. Embodiments may mark the speculative migrants to track the speculative element. Embodiments can create a speculative migrant by speculatively generating at least part of the generation N of the migrant source sub-population, and randomly selecting from those speculatively generated candidate solutions. A variable and/or statement configured as a migration parameter or a speculation constraint may limit the number of speculative migrants allowed, may allow use of speculative migrants when the migration rate is low, and/or may limit speculative migrants to one source. For instance, a speculation constraint can restrict creation and use of speculative migrants to situations when only one migrant source sub-population is behind the migrant destination sub-population.

At block 619, X(N+1) is dispatched to a computing node.

Although FIG. 6 depicts generating a speculative migrant, embodiments are not so limited. Some embodiments leave space to receive migrants later and allow a sub-population to advance to a next generation with less than a full set of candidate solutions. Other embodiments generate a full set of candidate solutions for the generation of the sub-population, and replace some with migrant candidate solutions later. Embodiments that generate candidate solutions to be replaced with migrant candidate solutions can generate actual candidate solutions, generate placeholder candidate solutions (e.g., unpopulated data structures), copy already generated candidate solutions and mark the copies for replacement, etc.

Figure 7:
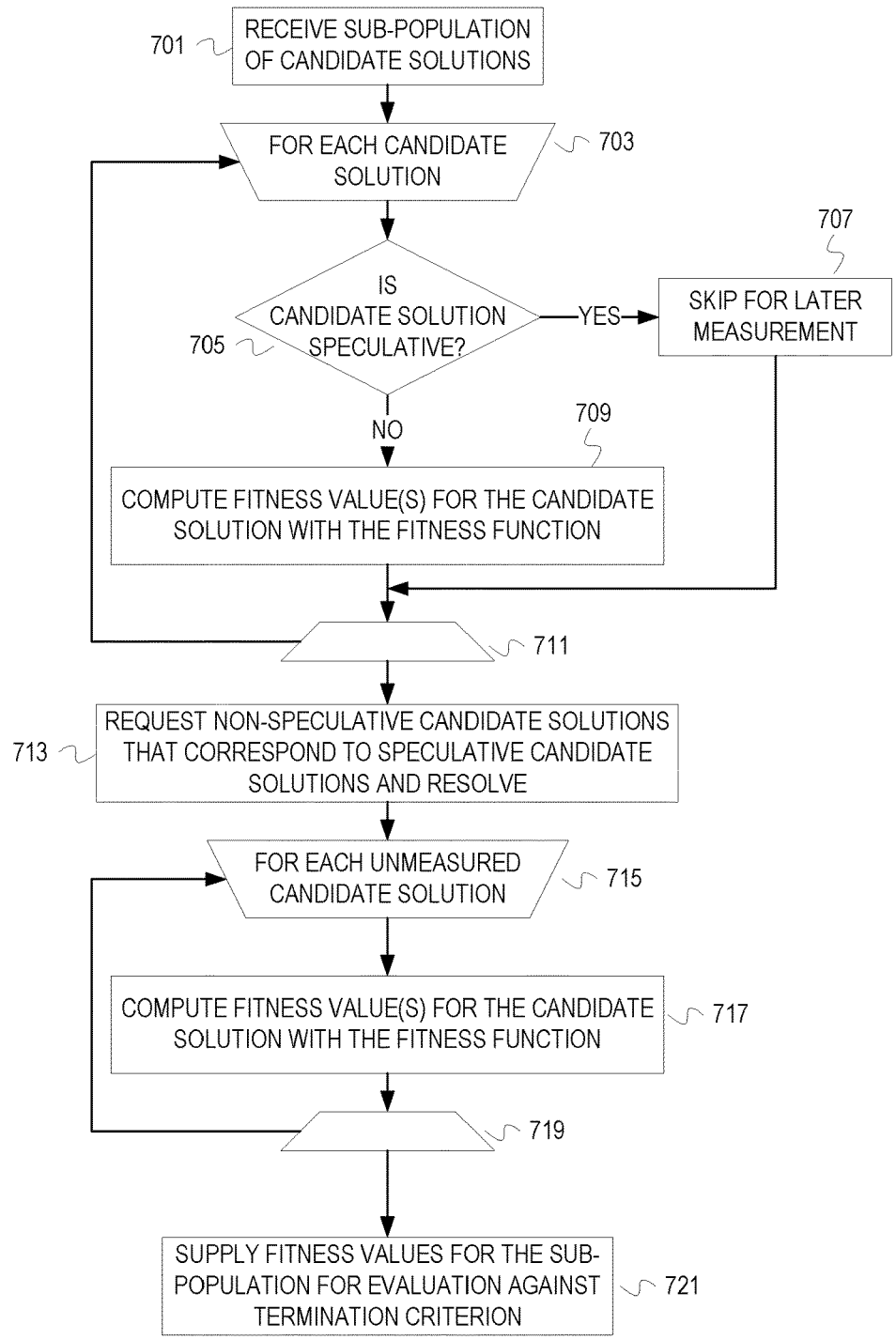
FIG. 7 depicts a flowchart of example operations for applying a fitness function in an evolutionary computing process with speculative evolution.

FIG. 7 depicts a flowchart of example operations for applying a fitness function in an evolutionary computing process with speculative evolution. At a block 701, a generation of a subpopulation of candidate solutions is received. For example, an evolutionary computing management node transmits or passes a third generation of a sub-population A of candidate solutions to the node responsible for the sub-population A.

At block 703, operations begin for each candidate solution in the received generation. At block 705, it is determined if the candidate solution is a speculative candidate solution. The candidate solution may be a speculative candidate solution created to accelerate evolution for a sub-population. For instance, a migrant candidate solution may not have been available. As another example, the candidate solution may have been created from a candidate solution that was speculatively ranked. If the candidate solution is speculative, then control flows to block 707. If the candidate solution is not speculative, then control flows to block 709.

At block 707, the speculative candidate solution is skipped. Implementations can skip a candidate solution with a variety of techniques. An implementation can mark the speculative candidate solution to indicate that it still waits computing a fitness value. An implementation can skip marking the speculative candidate solution when others are marked as completed after the fitness value is computed. An implementation can store a skipped candidate solution in a different memory location, file, record, etc. Control flows from block 707 to block 711.

At block 709, one or more fitness values are computed for the candidate solution with a fitness function. The fitness function has been previously defined for the optimization problem. Control flows from block 709 to block 711. If there are additional candidate solutions, then control flows back to block 703. Otherwise, control flows to block 713.

At block 713, non-speculative candidate solutions that correspond to the skipped speculative candidate solutions are requested. It is possible that previously unavailable migrant candidate solutions are available, or actual rankings are possible at this point. If a non-speculative candidate solution is available, then the speculative candidate solutions are resolved. For instance, speculative migrants are replaced with actual migrants. Or candidate solutions spawned from speculative ranking are replaced with a candidate solution based on actual ranking.

At block 715, operations begin for each unmeasured candidate solution. The unmeasured candidate solutions can include skipped speculative candidate solutions that could not be resolved, and/or candidate solutions that replaced the speculative candidate solutions. At block 717, a fitness value is computed for the unmeasured candidate solution in accordance with the fitness function. Control flows from block 717 to block 719. Processing continues to the next unmeasured candidate solution if it is determined an additional exists at block 719. Otherwise, control flows from block 719 to block 721.

At block 721, the fitness values for the generation of the sub-population are supplied for evaluation against one or more termination criteria. The fitness values may be passed to another program or function hosted at the node that computed the fitness values. The fitness value may be stored at a shared resource, and the location communicated to a node performing evaluations. The fitness values may be literally sent to a node or nodes performing evaluations.

As mentioned above, some candidate solutions may result from speculative ranking. Speculative ranking can be used to accelerate evolution of a sub-population that is falling too far behind other sub-populations. A threshold can be configured to define "too far behind." For example, speculative ranking can be triggered when a sub-population is n generations behind the next slowest node or n generations behind the average generation of other nodes. As another example, the evolutionary process can be configured to speculatively ranking when more than 75% of the nodes are waiting to continue to a next iteration.

Figure 8:
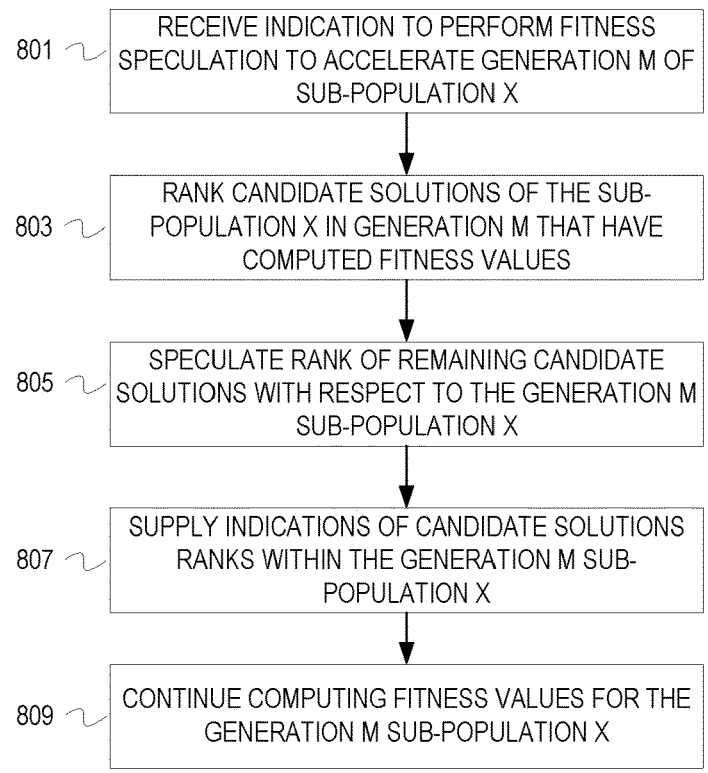
FIG. 8 depicts a flowchart of example operations for speculatively ranking candidate solutions.

FIG. 8 depicts a flowchart of example operations for speculatively ranking candidate solutions. At block 801, an indication is received to perform fitness speculation to accelerate generation M of a sub-population X ("X(M)"). For example, a manager node detects that condition(s) for requesting speculatively ranking to accelerate evolution exists for the sub-population X. The managing node then requests the node handling sub-population X to speculatively rank the candidate solutions of X(M).

At block 803, the candidate solutions of X(M) that have computed fitness values are ranked. A node may have already started computing fitness values for X(M) when the instruction to initiate speculative ranking is received.

At block 805, rank of the remaining candidate solutions (i.e., those of the candidate solutions without fitness values) is speculated with respect to the other candidate solutions of X(M). An example of a selection technique that uses ranking is tournament selection. Embodiments can speculate as to fitness instead of or in addition to rank. Embodiments can predict fitness using median fitness values of similar candidate solutions, the similar candidate solutions being those with a small hamming distance from the candidate solution for which the ranking is being speculated. Embodiments can also speculate based on hamming distances relative to parent candidate solutions. A tool can speculate that a fitness value for an offspring candidate solution will be the same as one of the parents (or parent in mutations) with a smaller hamming distance. Embodiments can also regulate speculation with confidence in the speculation. Embodiments can base confidence on a number of similar individuals and a spread of fitness values thereof. Furthermore, embodiments can incorporate an estimated misprediction penalty into the confidence. The estimated penalty can be based on rank of similar candidate solutions, the speculative rank, and sub-population size. The lower the speculative rank and the higher the selective pressure (e.g., greater tendency to select most fit candidate solutions), the lower the misprediction penalty because the candidate solution may not participate in an evolutionary operation for generating a next generation. Thus, the speculative ranking would have no impact. Moreover, speculative ranking lowers the impact of mispredicted fitness values. Even though a predicted/speculative fitness value for a confidence value may be wrong, the speculative rank can still be correct. If the speculative ranking is validated, then the speculative tag or marking can be removed or ignored despite an incorrect speculative fitness value.

At block 807, indications of the candidate solutions ranks within X(M) are supplied. For example, data indicating the rankings of X(M) and that the rankings are speculative are transmitted to a manager node. This allows the manager node to proceed with creating a next generation for the sub-population X. Candidate solutions of X(M+1) are marked or tracked as spawning from a speculatively ranked generation of candidate solutions for sub-population X. Embodiments are not required to speculate rank and supply speculative rank. Embodiments can speculate fitness values, and provide speculative fitness values.

At block 809, the node handling sub-population X resumes computing fitness values for candidate solutions. Although the next generation is being created with speculative ranking, an actual ranking with actual fitness values is computed to allow resolution of speculative elements later.

The depicted flowcharts are for explanatory purposes, and do not limit embodiments of the inventive subject matter. Embodiments can perform different operations, fewer operations, additional operations, operations in parallel, operations across different functional implementations (e.g., processors, programs, etc.). For instance, embodiments may not skip candidate solutions as depicted in FIG. 7 at block 707. Embodiments can proceed with computing a fitness value for a speculative candidate solution. As another example, embodiments may not skip speculative candidate solutions, and compute fitness values for the speculative candidate solutions. In that case, embodiments can forgo the operations depicted at blocks 713, 715, 717, and 719. With respect to FIG. 8, embodiments can speculate rank and/or fitness for a candidate solution in accordance with different techniques. For example, block 809 may be performed separately. An implementation can assign a different node to continue with computing fitness values for X(M) so that the currently responsible node can begin computing fitness values for X(M+1). An implementation may utilize a waiting node to finish computing fitness values for X(M), or to assume responsibility for sub-population X at least at generation M+1. In another implementation, one or more nodes can be tasked with computing fitness values and validating speculated ranking/fitness. With respect to FIG. 6, additional operations may be performed if the sub-populations are associated with different fitness functions. An implementation will recompute a fitness value(s) for a migrant candidate solution if the fitness functions between the source and destination are different. The operations across FIGS. 3 and 7 can be different in an implementation that evaluates candidate solutions as their fitness values are computed. When a candidate solution is determined to satisfy a termination criterion, nodes that have advanced to a later generation can be notified to stop working on speculative generations beyond the terminating generation.

Evolutionary computing tools can also speculate for cataclysms. An evolutionary computing tool that implements a cataclysm in an evolutionary run can employ speculation with high confidence. A tool can be configured to perform a mass-extinction type of cataclysm on a sub-population if fitness of the sub-population (i.e., fitness of best candidate solution) does not improve after y generations. While evaluating a generation of a sub-population that would exceed the y generation threshold if it fails to make forward progress, the tool can speculate that fitness of the generation of the sub-population will not improve after evaluating z candidate solutions. In other words, the tool can predict that the remaining candidate solutions to be evaluated will not improve fitness of the generation of the sub-population. Without waiting for evaluation of the current generation of the sub-population to complete, the tool selects a fittest (or a few fittest) of the evaluated candidate solutions for a next generation of the sub-population, and completes the rest of the next generation of the sub-population with random candidate solutions since the other candidate solutions of the current generation of the sub-population go extinct. The tool can speculate, with relatively high confidence, that the unevaluated candidate solutions of the current generation of the sub-population will not prevent the cataclysm since so few candidate solutions survive a cataclysm. The next generation of the sub-population are marked to indicate a speculative element, and the speculation rolled back if the tool determines that one of the remaining candidate solutions of the current generation of the sub-population in fact prevent the cataclysm.

As will be appreciated by one skilled in the art, aspects of the present inventive subject matter may be embodied as a system, method or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Implementation can vary widely as to task division. The tasks of generating candidate solutions, computing fitness values, and evaluating fitness values against termination criteria can be configured across nodes in a variety of ways or permutations. Use of "manager" or "management" node refers to a node that manages the evolutionary computing process across multiple nodes. Although functionality can be divided in various manners, a managing node will at least be aware of progress by each sub-population and when a termination criterion has been satisfied. Embodiments can vary in architecture and/or configuration to be tightly centralized at a managing node or more distributed. In a more distributed architecture, nodes will maintain communications to keep each other aware of progress and satisfaction of the termination criterion by any sub-population. For example, an embodiment can vertically task each node with all operations for a sub-population. Each node can iteratively generate candidate solutions, perform evolutionary operations, compute fitness values, and evaluate each generation for a sub-population. Until migration impacts a generation, each node can advance at its own pace and communicate progress to all other nodes. In addition, each node can be responsible for creating speculative migrants and passing those speculative migrants to neighboring nodes.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
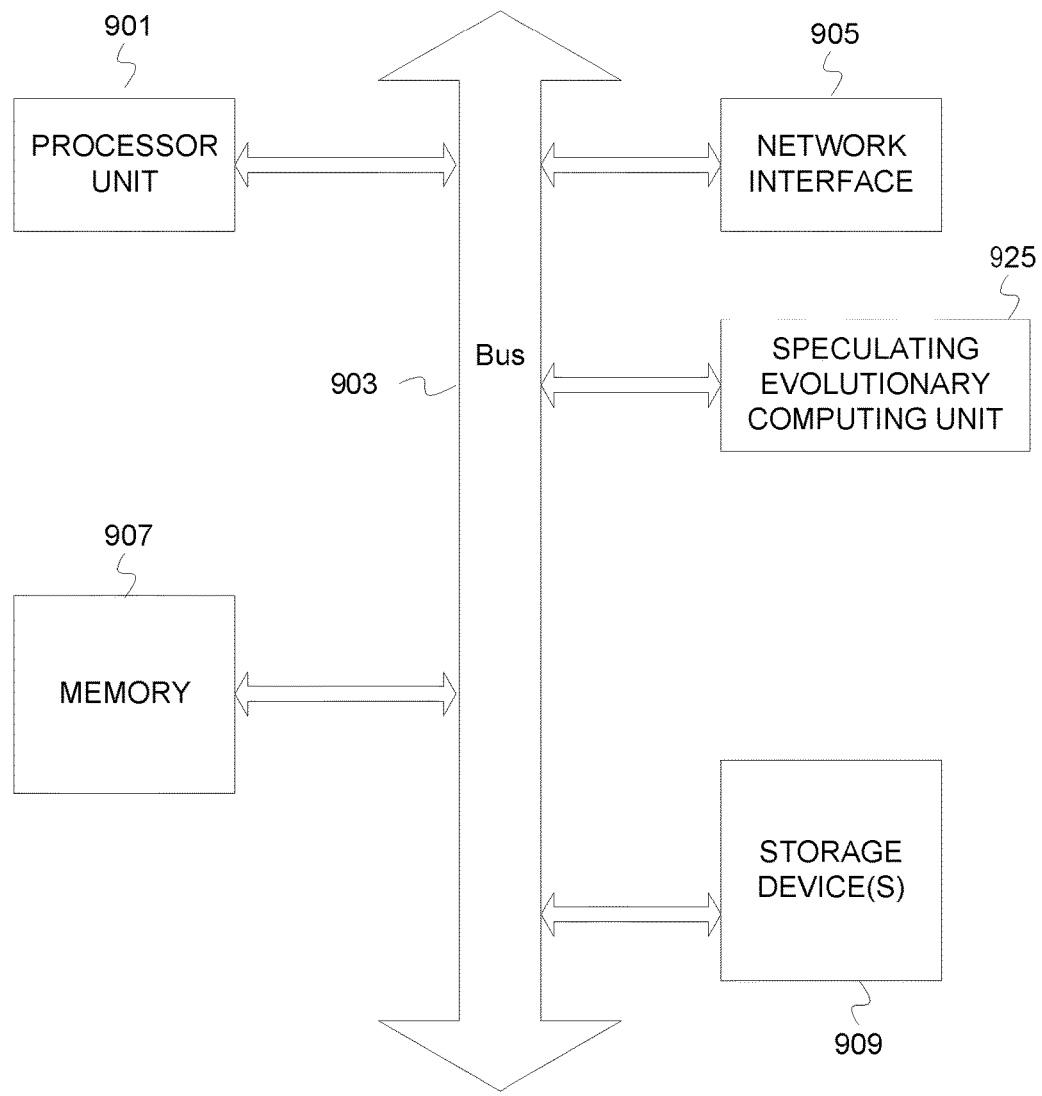
FIG. 9 depicts an example computer system.

FIG. 9 depicts an example computer system. A computer system includes a processor unit 901 (possibly including multiple processors, multiple cores, multiple nodes, and/or implementing multi-threading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport®, InfiniBand®, NuBus, etc.), a network interface 905 (e.g., an ATM interface, an Ethernet interface, a Frame Relay interface, SONET interface, wireless interface, etc.), and a storage device(s) 909 (e.g., optical storage, magnetic storage, etc.). The system also includes a speculating evolutionary computing unit 925. The speculating evolutionary computing unit 925 implements functionality for speculating termination, creating a speculative migrant, and/or speculative ranking/fitness. Any one of these functionalities may be partially (or entirely) implemented in hardware and/or on the processing unit 901. For example, the functionality may be implemented with an application specific integrated circuit, in logic implemented in the processing unit 901, in a co-processor on a peripheral device or card, etc. Further, realizations may include fewer or additional components not illustrated in FIG. 9 (e.g., video cards, audio cards, additional network interfaces, peripheral devices, etc.). The processor unit 901, the storage device(s) 909, and the network interface 905 are coupled to the bus 903. Although illustrated as being coupled to the bus 903, the memory 907 may be coupled to the processor unit 901.

While the embodiments are described with reference to various implementations and exploitations, it will be understood that these embodiments are illustrative and that the scope of the inventive subject matter is not limited to them. Embodiments are not limited to those described herein. A variety of evolutionary algorithms and computing techniques can be employed for the inventive subject matter. Numerous permutations of evolutionary algorithms and computational techniques (e.g., virtualization and a particular genetic algorithm, various hardware configurations with a proprietary evolutionary algorithm, etc.) that exist and that may be developed in the dynamic field of evolutionary computing and artificial intelligence can leverage the inventive subject matter described herein.

In general, techniques for speculating in evolutionary computing to allow sub-populations to advance asynchronously as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components.

These and other variations, modifications, additions, and improvements may fall within the scope of the inventive subject matter.

What is claimed is:

1. A computer implemented method for speculative evolutionary computing, the method comprising:
    receiving, via one or more processors, fitness values for a first generation of a first sub-population of a plurality of sub-populations, wherein a population of candidate solutions for an optimization problem was previously divided into the plurality of sub-populations, wherein the population of candidate solutions was created for an iterative computing process in accordance with an evolutionary algorithm to identify a most fit candidate solution for the optimization problem;
    determining, via at least one of the processors, whether the first generation of the first sub-population does not satisfy a termination criterion for the iterative computing processing;
    determining, via at least one of the processors, whether the first generation corresponds to a later iteration of the iterative computing process than a second generation of a second sub-population of the plurality of sub-populations;
    determining, via at least one of the processors, whether a difference between the first generation and the second generation does not exceed a termination speculation threshold; and
    generating, via at least one of the processors, a third generation of the first sub-population responsive to a determination that the difference between the first generation and the second generation does not exceed the termination speculation threshold, wherein the generating the third generation of the first sub-population based, at least in part, on the fitness values.

2. The method of claim 1, wherein said generating the third generation of the first sub-population includes generating the third generation in accordance with one or more evolutionary computing techniques implemented in accordance with the evolutionary algorithm.

3. The method of claim 2, wherein the one or more evolutionary computing techniques comprise at least one of crossover, mutation, and reproduction.

4. The method of claim 1, further comprising dividing, via at least one of the processors, the population of candidate solutions for the optimization problem into the plurality of sub-populations of candidate solutions and assigning the plurality of sub-populations to computing resources.

5. The method of claim 1, wherein determining whether the first generation corresponds to the later iteration of the iterative computing process than the second generation of the second sub-population of the plurality of sub-populations comprises:
    accessing generation tracking data based on a first computing resource identifier and a second computing resource identifier,
        wherein the generation tracking data indicates an iteration of the iterative computing process for each of a plurality of computing resources,
        wherein the first computing resource identifier identifies a first computing resource of the plurality of computing resources and the second computing resource identifier identifies a second computing resource of the plurality of computing resources,
        wherein the first computing resource is associated with the first sub-population and the second computing resource is associated with the second sub-population; and
    comparing a first iteration indicated for the first computing resource and a second iteration indicated for the second computing resource identifier.

6. The method of claim 1, further comprising:
    determining, via at least one of the processors, that the third generation of the first sub-population should receive a migrant candidate solution from a neighboring one of the plurality of sub-populations;
    determining, via at least one of the processors, that the migrant candidate solution from the neighboring one of the plurality of sub-populations is not available;
    creating, via at least one of the processors, a speculative migrant candidate solution; and
    inserting, via at least one of the processors, the speculative migrant candidate solution into the third generation of the first sub-population of candidate solutions.

7. The method of claim 6, further comprising determining that a condition for speculatively creating the migrant candidate solution is satisfied before said creating the speculative migrant candidate solution.

8. The method of claim 6, further comprising tagging the speculative migrant candidate solution to indicate speculative.

* * * * *